United States Patent [19]

Meckley

[11] Patent Number: 4,930,076
[45] Date of Patent: May 29, 1990

[54] SYSTOLIC RADON TRANSFORM PROCESSOR

[75] Inventor: John R. Meckley, Voorhees Township, Camden County, N.J.

[73] Assignee: General Electric Company, Moorestown, N.J.

[21] Appl. No.: 269,027

[22] Filed: Nov. 9, 1988

[51] Int. Cl.$^5$ ............................................. G06F 15/62
[52] U.S. Cl. .............................. 364/413.21; 364/421; 367/63
[58] Field of Search .............. 364/413.19, 421, 413.14, 364/413.15, 413.21; 367/63, 73, 43

[56] References Cited

U.S. PATENT DOCUMENTS

| | | | |
|---|---|---|---|
| 4,506,327 | 3/1985 | Tam | 364/413.19 |
| 4,628,492 | 12/1986 | Winney | 367/63 |
| 4,633,398 | 12/1986 | Gullbey | 364/413.21 |
| 4,677,554 | 6/1987 | Dobbs | 364/413.15 |
| 4,709,333 | 11/1987 | Crawford | 364/413.14 |
| 4,760,563 | 7/1988 | Beylkin | 367/73 |
| 4,766,574 | 8/1988 | Whitmore | 364/421 |
| 4,779,238 | 10/1988 | Howard | 364/421 |
| 4,878,169 | 10/1989 | Toner | 364/413.19 |

OTHER PUBLICATIONS

Pages 2-8-2-11 of Integrated Device Technology, Inc. Data Book.

*Primary Examiner*—Michael R. Fleming
*Attorney, Agent, or Firm*—William H. Meise

[57] ABSTRACT

An array of Radon transform processors accepts signals representative of the x and y positions of each pixel of an image together with signals representative of the magnitude or brightness of the image. Each Radon transform processor of the array is associated with one value of $\theta$, an angle relative to the x-axis, and each processor is associated with a different $\theta$. Each radon transform processor multiplies the current value of x by cos $\theta$ and the current value of y by sin $\theta$, and adds the products to produce the value of rho, the distance from the image center along a line at angle $\theta$, at which each pixel contributes to a line integral. A memory stores the current pixel's magnitude by updating the line integral associated with the current value of rho by adding the pixel magnitude. When all pixels of the image have been evaluated, the memory of each processor of the array is read in sequence, and the value of the line integral for each value of rho is read from each memory. The Radon transform may be processed. A backprojection processor performs an equivalent systolic image generation from the processed Radon transform.

9 Claims, 8 Drawing Sheets

SYSTOLIC RADON TRANSFORM PROCESSOR

BACKGROUND OF THE INVENTION

This invention relates to a processor for generating and processing the Radon transform, and for regenerating an image by the inverse Radon transform.

Computer aided tomography (CAT) scanners at the present state of the art physically move an X-ray source in a circular path around the object being examined. A plurality of detectors spaced about the object respond to the radiation, which is processed to produce an image representative of the interior of the object.

Seismic exploration is conducted by the radiation of seismic waves from one or more points and the collection of the resulting energy at other points by means of geophones. The signals produced by the geophones are processed to produce an image representative of subterranean structure. The signal processing used in both of these techniques involves the Radon transform. The Radon transform is customarily calculated based upon the signals produced by multiple detectors by performing calculations in a general-purpose computer, as described, for example, in U.S. Pat. No. 4,633,398 issued Dec. 30, 1986 to Gullberg et al. and in U.S. Pat. No. 4,628,492 issued Dec. 9, 1986 to Winney.

New methods of tomography including schemes for causing the source of X-rays to move without moving a physical structure have been proposed. Furthermore, real-time processing for geophysical exploration would be advantageous. Consequently, there is a need for systems for computing and processing the Radon transform on a real-time basis.

SUMMARY OF THE INVENTION

A line-scan-to-Radon-transform converter is adapted for receiving words representing the x- and y-axis location of each pixel of an image together with words representing the amplitude of the associated pixel. The converter includes a first memory preprogrammed with information relating to the particular value of an angle $\theta$ relative to the x-axis at which the Radon transform is to be calculated. A first multiplier is connected to the first memory means and is also coupled to sequentially receive, for each pixel in its turn, the x-axis word representing the x-position of the pixel for producing a first product signal representative of the x-axis word multiplied by a trigonometric function of $\theta$. A second multiplier is also coupled to the first memory and to receive the y-axis word representing the y-position of the pixel for producing a second product signal representative of the y-axis word multiplied by another trigonometric function of $\theta$. An adder is coupled to the first and second multipliers for adding together the first and second product signals relating to the same pixel for generating a sum signal indicative of the value of $\rho$ at which the pixel contributes to the Radon transform for the selected value of $\theta$. A second memory arrangement includes individual memory or storage locations addressed by each of a plurality of values of $\rho$. The second memory arrangement is addressed by the sum signal from the adder for producing for each addressed storage location a cumulated signal representing the current value of the line integral at the value of $\rho$ corresponding to the pixel at that selected value of $\theta$. A summer is coupled to the second memory arrangement for receiving the cumulated signal from the storage location addressed by the sum signal for updating the cumulated signal at the particular storage location in question by adding to the cumulated signal the word representing the amplitude of the pixel. A reading arrangement is coupled to the second memory arrangement and is adapted to be enabled for reading from the storage locations the value of the line integral for each value of $\rho$ at the particular value of $\theta$.

DESCRIPTION OF THE DRAWING

FIG. 1a depicts a Cartesian coordinate system including x and y axes together with an arbitrarily-shaped image, and also illustrates an arbitrarily selected angle $\theta$ and a $\rho$ axis, and FIG. 1b illustrates a plot of an arbitrary line integral along the $\rho$ axis of FIG. 1a;

DESCRIPTION OF THE INVENTION

Figures 1A, 1B:
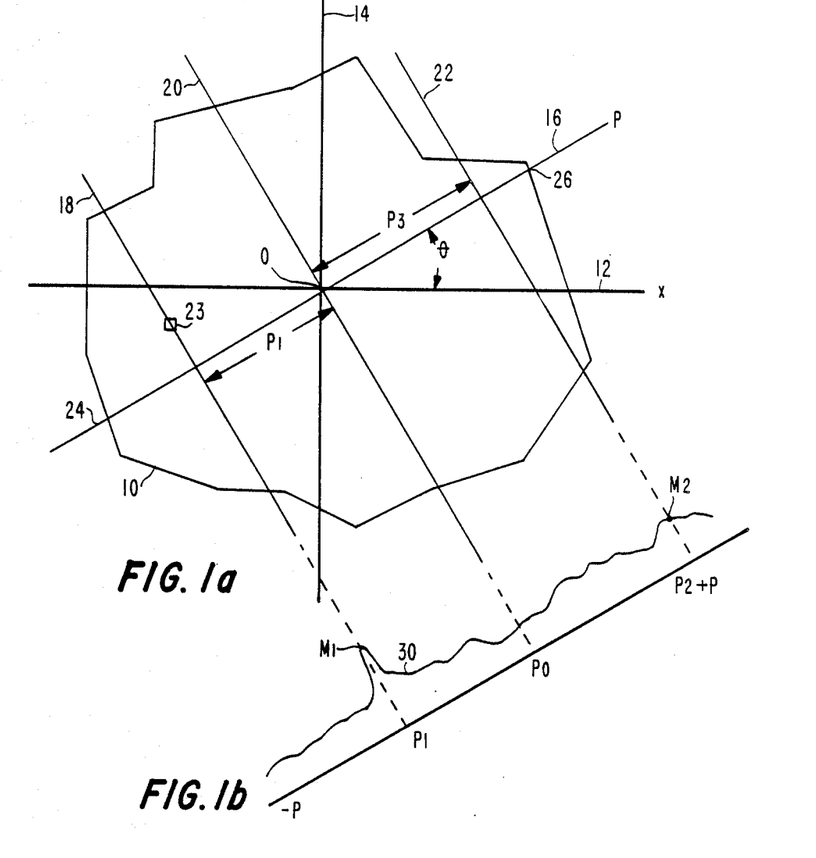

FIG. 1a illustrates an arbitrarily shaped image 10, the geometric center of which is located at the origin O of a Cartesian coordinate system including an x-axis 12 and a y-axis 14. A selected $\rho$ axis 16 passes through origin O making an angle $\theta$ with the x-axis. Also illustrated in FIG. 1a are three lines 18, 20, and 22 which pass orthogonally through $\rho$ axis 16. In general, many $\rho$ axes are possible, with values of $\theta$ ranging from 0° to 180°. For each $\rho$ axis so generated, there are in principle an infinite number of lines such as 18, 20, and 22 orthogonal to the $\rho$ axis. Just as the infinite number of possible $\rho$ axes can be quantized in 1° increments to a total of 180, the potentially infinite number of lines such as 18, 20, and 22 may be reduced to a finite number by quantization at incremental values of $\rho$.

In FIG. 1a, an arbitrarily selected pixel 23 lies on line 18. Pixel 23 and all other pixels lying on line 18 have their grey-scale value (their amplitudes) summed to produce a line-integral value which is associated with the value of $\rho$, namely $\rho_1$, which identifies the position of line 18 at its crossing of the $\rho$ axis. Similarly, line 20 corresponds to or is associated with $\rho_0$, and line 22 is associated with a third value of $\rho$, namely $\rho_3$. Just as in the case of line 18, all of the pixels (none illustrated) contain within image 10 which lie on line 20 contribute their amplitudes to the line integral associated with line 20. All other lines orthogonal to the $\rho$ axis, such as line 22, are associated with a line integral representing the sum of the grey-scale values of all of the pixels within image area 10 which lie on the particular line.

FIG. 1b represents the projection of the line integrals of all of the lines orthogonal to the $\rho$ axis illustrated in FIG. 1a. In FIG. 1b, plot 30 represents, for each value of $\rho$, the magnitude of the line integral for that value of $\rho$. For example, at a position of $\rho_1$, magnitude of plot 30 has a peak, thereby indicating that the line integral taken along line 18 of FIG. 1a has more pixels, such as pixel 23, having a higher amplitude or brightness than do other line integrals along lines such as 20 or 22. In general, peaks in the amplitude of the projection of the line integrals onto the $\rho$ axis are indicative of a linear feature or line orthogonal to the particular $\rho$ axis associated with a particular value of $\theta$. The Radon transform is the result of generating line integrals for all values of $\rho$ for all values of $\theta$. Naturally, a finite number of line integrals associated with each of a finite number of values of $\theta$ will approximate the Radon transform.

Figure 2:
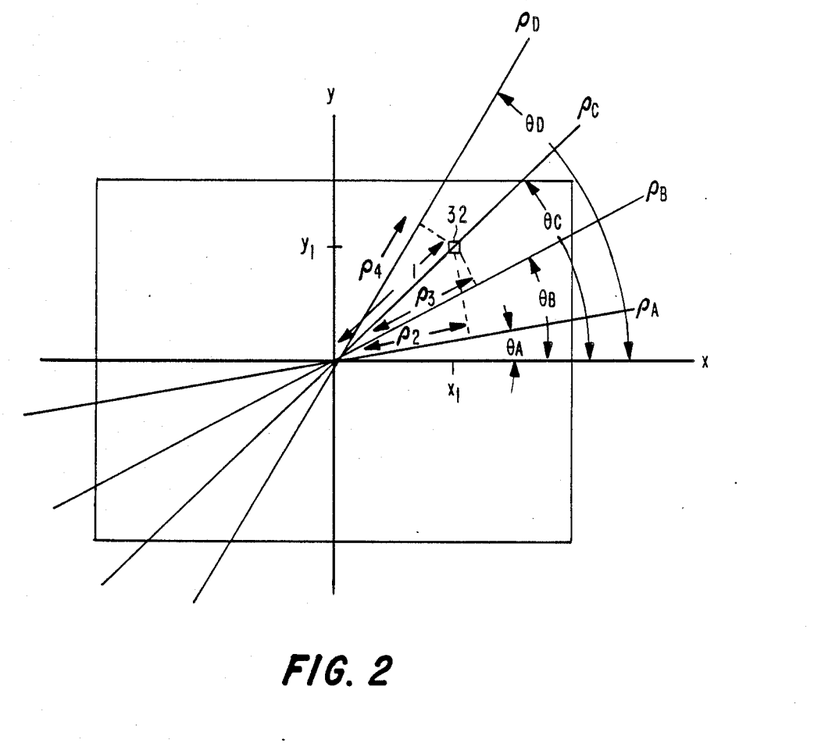
FIG. 2 illustrates a rectangular image together with several $\rho$ axes aiding in understanding how a particular pixel contributes to several line integrals.

Each pixel such as pixel 23 of FIG. 1a or pixel 32 of FIG. 2 contributes its amplitude to many line integrals. This is explained by reference to FIG. 2, in which pixel 32 has a location defined by $x_1$, $y_1$ in a Cartesian X-Y coordinate system. In FIG. 2, a $\rho_A$ axis makes an angle $\theta_A$ with the x axis, a $\rho_B$ axis makes an angle of $\theta_B$ with the x axis, and the $\rho_C$, $\rho_D$ axes make corresponding angles $\theta_C$, $\theta_D$ with the x axis. Pixel 32 happens to lie on the $\rho_C$ axis. Consequently, pixel 32 contributes the magnitude of its brightness or grey-scale value to the line integral associated with a radius of $\rho_1$ along the $\rho_C$ axis. However, pixel 32 contributes to line integrals of all of the other axes. For example, pixel 32 contributes its value to a line integral associated with the $\rho_A$ axis at a value of $\rho$ as measured along the $\rho_A$ axis defined by $\rho_2$. Pixel 32 also contributes the value of its brightness to a line integral associated with position $\rho_3$ along the $\rho_B$ axis. In order to illustrate that $\rho$ axes on the other side of the pixel also receive contributions, pixel 32 further contributes the value of its brightness to a line integral associated with position $\rho_4$ along the $\rho_D$ axis. In general, each pixel contributes its value to at least one line integral of each $\rho$ axis ranging from 0° to 180°.

Figure 3A:
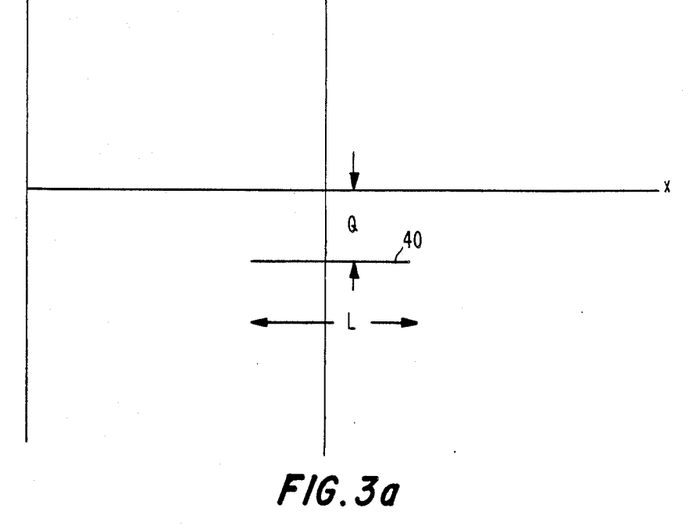
FIG. 3a illustrates an image in the form of a horizontal line offset from the x-axis.
Figure 3B:
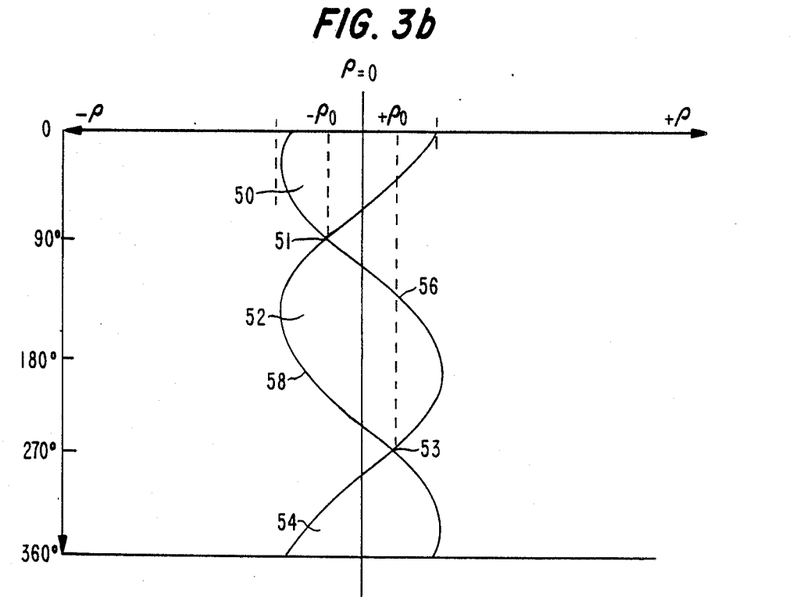
FIG. 3b illustrates its Radon transform.

FIG. 3a illustrates a linear feature in the form of a straight line 40 having length L and lying in an X-Y coordinate system. Each pixel of line 40 has a value of unity (bright) and the surrounding area pixels have a value of zero (dark). As illustrated in FIG. 3a, line 40 is parallel to the x axis and offset by the distance Q from the origin. FIG. 3b illustrates by lines 56 and 58 the Radon transform in the $\rho$, $\theta$ plane of the image of FIG. 3a. The plot of FIG. 3b is one plane of a 3-dimensional plot in which the third dimension (not illustrated) represents the amplitude of the Radon transform. As illustrated in FIG. 3b, regions 50, 52, and 54 lying between lines 56 and 58 have a finite value which would be represented on a cathode ray display by bright area of variable intensity, and the regions outside the portion encompassed by lines 56 and 58 would have zero value, represented by a dark region. As illustrated in FIG. 3b, lines 56 and 58 cross at a point 51 at $\theta = 90°$ at a value of $-\rho_o$. This means that when the $\rho$ axis in FIG. 3a is vertical and passes through the origin, that the line integral associated with feature 40 occurs at only one spot, namely at the value of $\rho$ corresponding to the offset, which is $-\rho_o$. The magnitude or amplitude of the Radon transform at point 51 is L. As illustrated in FIG. 3b, the Radon transform is being made through 360° rather than through 180°, and consequently redundant information is shown. The redundant information can be seen, for example, in the crossing of lines 56 and 58 at $\theta = 270°$, $+\rho_o$, which, again, represents the line integral of magnitude L at a single value of $\rho$ for a downwardly directed $\rho$ axis. At angles of the $\rho$ axis relative to the x axis other than 90° and 270°, the Radon transform illustrated in FIG. 3b has finite values for more than one value of $\rho$, which is readily understandable in view of the discussion relating to FIG. 2.

Figure 4:
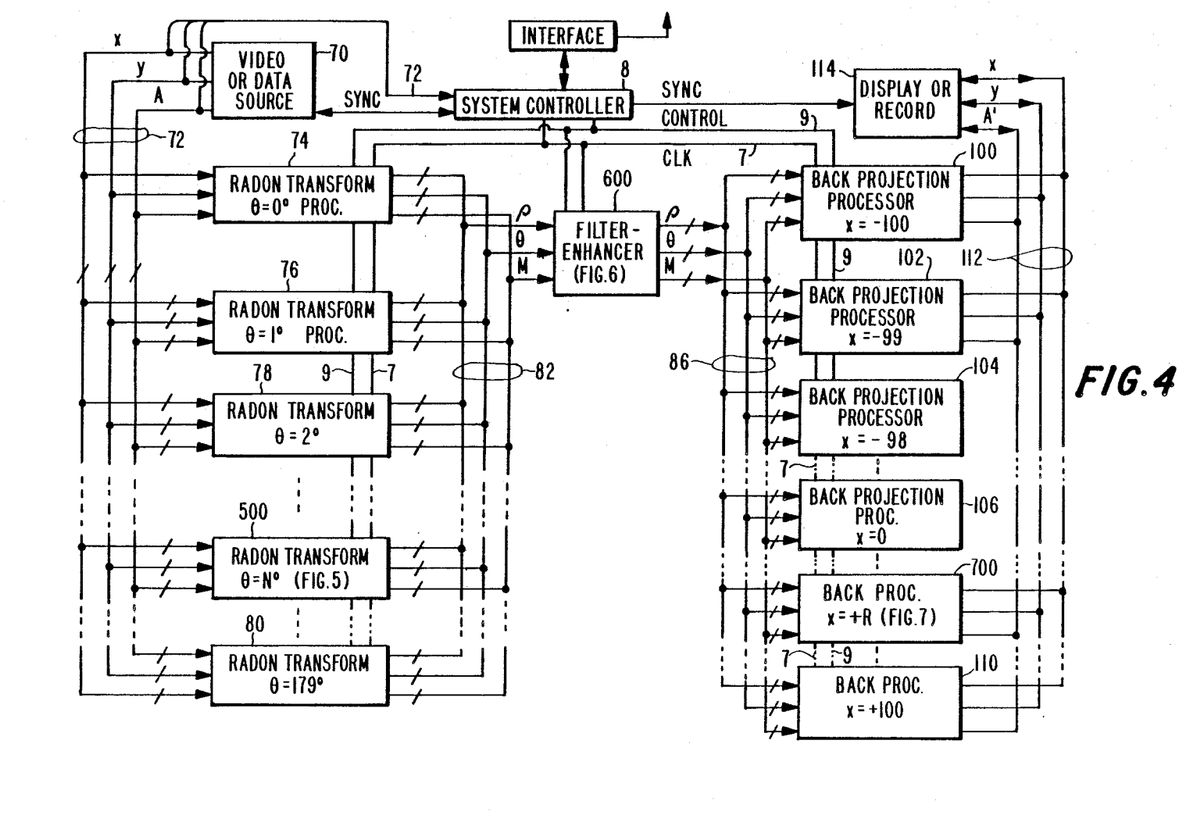
FIG. 4 illustrates a system coupled to a source of image signal and including an array of Radon transform processors for computing the Radon transform for a predetermined number of values of $\theta$, an enhancer and an array of back projection processors for regenerating an image from the filtered or enhanced Radon transform.

FIG. 4 is a simplified block diagram of a processor for the Radon transform. In FIG. 4, a source 70 of video or data produces pixel amplitude representative signals A and associated with each value of A produces a word representative of the x position and of the y position of the pixel in a Cartesian coordinate system, all under the control of a system controller 8. The signals produced by source 70 are applied over a bus 72 to the system controller and to the inputs of a plurality of Radon transform processors, each of which is associated with a different value of $\theta$. For example, processor 74 is associated with a $\theta$ of 0°, processor 76 is associated with $\theta = 1°$, transform processor 78 with $\theta = 2°$, and so on. The last processor, designated 80, is associated with a value of $\theta$ equal to 179°. There is no need to go from 179° to 360° because the additional data is redundant. In general, a Radon transform processor 400 is associated with a $\theta$ equal to N°, as illustrated by processor 500.

Each Radon transform processor 74, 76 . . . 80, 500 produces data representative of the amplitude of the projection of the line integral for each of many values of $\rho$. The output data of each transform processor includes the value $\theta$ with which the transform processor is associated, a signal M representing the magnitude of the line transform, and the value of $\rho$ along the axis at which the value M is found. To be more specific, the Radon transform processor of FIG. 4 associated with the angle $\theta$ illustrated in FIG. 1a, when commanded, produces at its output the signal $\theta$ which is unchanged at all times, and it also produces a signal $M_1$ at a value of $\rho_1$ and a signal of $M_2$ at a value of $\rho_2$, as illustrated in FIG. 1b, as well as all other values of M corresponding to all other values of $\rho$. Thus, value of M is produced for each discrete value of $\rho$. Details of Radon transform processor 500 are illustrated further in conjunction with FIG. 5. The signals produced by each of the Radon transformer processors 74-80, 500 of the array of FIG. 4 are applied over bus 82 to the input of a filter or feature enhancer illustrated as a block 600. Details of filter-enhancer 600 are described in conjunction with FIG. 6. Filter 600, under the control of controller 8, produces on an output bus 86 enhanced $\rho$, $\theta$, and M signals representative of the magnitude of the line integral projected onto the $\rho$ axis for particular values of $\rho$ and $\theta$.

The enhancement may be considered to be an improvement in the signal-to-noise ratio. These signals are applied to an array of backprojection processors illustrated as 100, 102, 104 . . . 110 which are also controlled by controller 8. The number of backprojection processors need not equal the number of Radon transform processors. There need be only enough processors on each side to provide the desired resolution. Each backprojection processor is associated with a particular value of x in the Cartesian coordinate system into which the enhanced Radon transform signal is to be transformed for display. For example, backprojection processor 100 is associated with a value of x equal to $-100$, which is intended to represent, for example, the left extreme of the image to be finally displayed. Similarly, backprojection processor 102 is associated with a value of x equal to −99, and is intended to represent the x position immediately adjacent to the left extreme. In a similar manner, backprojection processor 106 is associated with a value of x equal to 0, which is the center of the final image, and processor 110 is associated with a value of x equal to +100, which is the right extreme of the image. Thus, there are a total of 201 backprojection processors. Naturally, more or less processors may be used. An arbitrarily selected backprojection processor 700 is associated with a value of x designated as +R, and is described below in conjunction with FIG. 7. The backprojection processors 100–110, 700 produce signals representative of the amplitude A' of the final image, together with its x and y coordinates in the Cartesian coordinate system.

Figure 5:
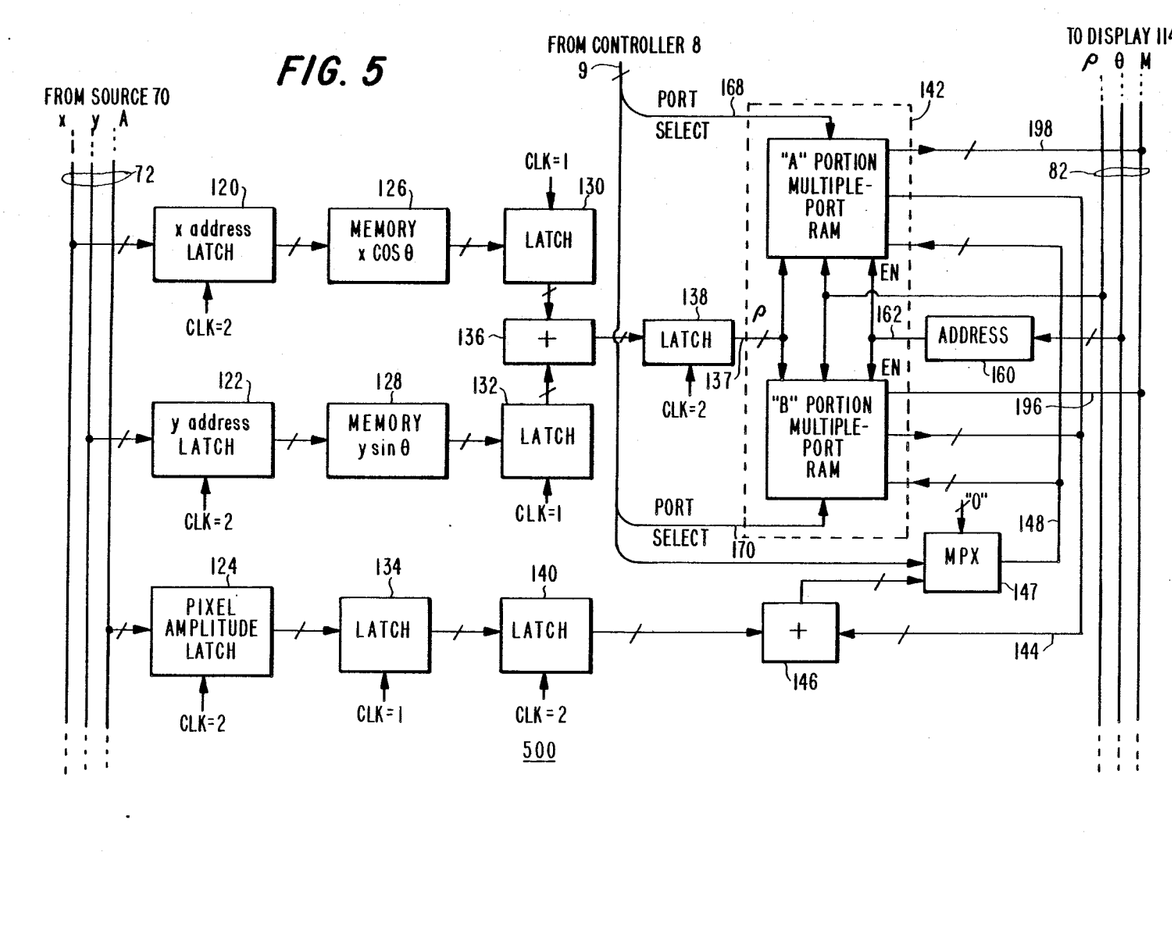
FIG. 5 illustrates in simplified block diagram form one of the processors of FIG. 4 for generating the Radon transform at a particular value of $\theta$.

FIG. 5 illustrates details of Radon transform processor 500 of FIG. 4. Elements of FIG. 5 corresponding to those of FIG. 4 are designated by the same reference numeral. In FIG. 5, the x, y and A information is clocked onto the appropriate portions of bus 72 during the first pulse (CLK=1) of a two-phase clock. During the second pulse (CLK=2) of the two-phase clock, the x address is latched by an x address latch 120, the y address is latched by a y address latch 122, and the pixel amplitude is latched by a further latch 124. The signals latched by latches 120 and 122 are applied as addresses to memories 126 and 128, respectively. Memory 126 is preprogrammed at each memory location addressable by a value of x with the product of that value of x multiplied by cosine of $\theta$. As mentioned, $\theta$ is a constant equal to N° in processor 500. Thus, upon the occurrence of the second pulse of the two-phase clock, memory 126 produces at its output the value of x multiplied by cosine N°. In a similar manner, memory 128 is preprogrammed at each memory location addressable by the value of y with the magnitude of y multiplied by the sine of N°. Therefore, upon the occurrence of the second pulse of the first cycle of the two-phase clock, memory 128 produces at its output the current value of y multiplied by the sine of $\theta$, where $\theta$ is a constant which depends upon the identity of processor 500. At the first pulse (CLK=1) of the next clock cycle, latches 130 and 132 latch the value of x cosine $\theta$ and y sine $\theta$, respectively. Simultaneously, a latch 134 latches the pixel amplitude from latch 124, to maintain the amplitude concurrent in time with the corresponding address information. Thus, at the end of the first pulse of the second cycle of the two-phase clock, the product of x cosine $\theta$ appears at the output of latch 130, the value of y sine $\theta$ occurs at the output of latch 132, and the magnitude A associated with the location defined by x and y appears at the output of latch 134. A summer (+) 136 receives the outputs of latches 130 and 132 and produces at its output the sum x cosine $\theta$ plus y sine $\theta$. At the second pulse of the second cycle of the two-phase clock, a latch 138 latches the sum produced by summer 136, and a latch 140 latches the corresponding value of amplitude A. The output of latch 138 on conductor set 137 represents the value of $\rho$ along the particular $\rho$ axis associated with $\theta$=N° to which the magnitude A contributes.

The value of $\rho$ is applied from latch 138 over conductor set 137 to address either the A or the B portion of a multiple-port RAM 142, under the control of a port select signal applied over bus 9 from system controller 8. As illustrated in FIG. 5, multiple-port RAM 142 is highly simplified; a more detailed block diagram appears in FIG. 8. The addressed A or B portion of multiple-port RAM 142 produces on conductor set 144 the data currently stored in that address. The information addressed in this manner represents the value of the line integral at the selected value of $\rho$ up to that point in the processing. The current value of the line integral is applied over conductor 144 to a further adder (+) 146 where it is added to the value latched by latch 140. Summer 146 produces at its output for application over a conductor set 148 and a multiplexer 147 a signal representing the updated value of the line integral, taking into account the current value A contributed by the pixel at location x, y. The signal is applied from summer 146 over conductor set 148 to inputs of the A and B portions of multiple-port RAM 142. On the first pulse (CLK=1) of the third cycle of the two-cycle clock, the value at the address still being selected by latch 138 is updated by being overwritten with the new, updated value of the line integral. Multiplexer 147 couples a hard-wired "zero" onto bus 148 under system control prior to processing actual data (i.e., during the "vertical interval" in normal television scanning) in order to zero the memory contents of multiple-port RAM 142. Those skilled in the art will recognize that the structure as so far described in FIG. 5 is a systolic or continuous processor which continually receives data over bus 72 and which processes the data for loading one of the A or B portions of multiple-port RAM 142 with line integral information.

When a complete video or data image has been applied over bus 72 to processor 400 of FIG. 5 and clocked into an A or B portion of RAM 142, the address locations of that portion of the RAM are loaded with a data set which corresponds to plot 30 of FIG. 1b for $\rho$=N°. For example, the selected portion of RAM 142 at a location corresponding to $\rho_1$ of FIG. 1b has a word stored corresponding to the value $M_1$ of FIG. 1b, and similarly at the memory address corresponding to $\rho_2$ has a word corresponding to $M_2$.

In general, the remaining portion of the arrangement of FIG. 5 constitutes a "ping-pong" arrangement for alternately loading one half of the memory with the stream of data while unloading the other half of the memory for further processing. In particular, if the A portion of RAM 142 was loaded during the preceding interval, the port select lines 168,170 are activated by the system controller logic to switch to the B portion for loading, while the A portion remains quiescent awaiting read control signals. Read control signals are applied over the $\rho$ and $\theta$ portions of bus 82 by the system controller.

Since processor 500 of FIG. 5 is associated with only one value of $\theta$, namely $\theta$=N°, data is only read from the A portion of RAM 142 when a control signal is applied over the $\theta$ portion of bus 82 which has a value N°. When a value N° is applied over bus $\theta$, a hard-wired address comparator 160 responds by producing an enable signal which is applied over a conductor 162 to enable both the A and B portions of multiple port RAM 142. However, the port select signal applied from the system controller over conductor 170 of bus 9 to the B portion of RAM 142 inhibits reading, whereas the port select signal applied on conductor 168 to the A portion allows reading to occur.

When the processor of FIG. 5 is addressed with a value N° on the $\theta$ line of bus 82, multiple-port RAM 142 is addressed in sequence for all values of $\rho$ over the $\rho$ line of bus 82. For each value of $\rho$ applied over bus 82, multiple-port RAM 142 produces the value of M corresponding to the line integral for that particular value of $\rho$ and applies it over conductor set 196 or 198 to the M conductor set of bus 82. Thus, assuming that there are 180 processors such as processor 500 in the arrangement of FIG. 4, and further assuming that for each transform processor such as 500 that line transforms are generated for each of 100 discrete values of $\rho$, then multiple-port RAM 142 will be addressed over the $\rho$ line of bus 82 with 100 different values of $\rho$ for $\theta = N°$. For each value Of $\rho$, multiple-port RAM 142 will produce one value M representing the line integral.

Referring once again to FIG. 4, each Radon processor 74–80, 500 is addressed in sequence by addressing for different values of $\theta$. For example, Radon transform processor 74 is addressed by $\theta = 0°$, and for 100 different values of $\rho$, to produce 100 different values of M which are applied to filter/enhancer 600. When the processing of transform processor 74 is completed, the value of $\theta$ on bus 82 is incremented to 1°, thereby addressing Radon transform processor 76, which in response to the 100 different values of $\rho$ produces in sequence the 100 corresponding values of M, which are applied to filter/enhancer 600. The processors are addressed in sequence, as described above, until finally transform processor 80 is addressed by a value of $\theta$ on bus 82 equal to 179°. For this value of $\theta$, the 100 different values of $\rho$ are applied in sequence to address the memory within processor 80 to produce the 100 corresponding values of M. During the process of reading the memories associated with Radon transform processors 74–80, 500, video source 70 has been producing further video data which the Radon transform processors have been processing. Thus, a continuous stream of data flows to filter/enhancer 600.

Figure 6:
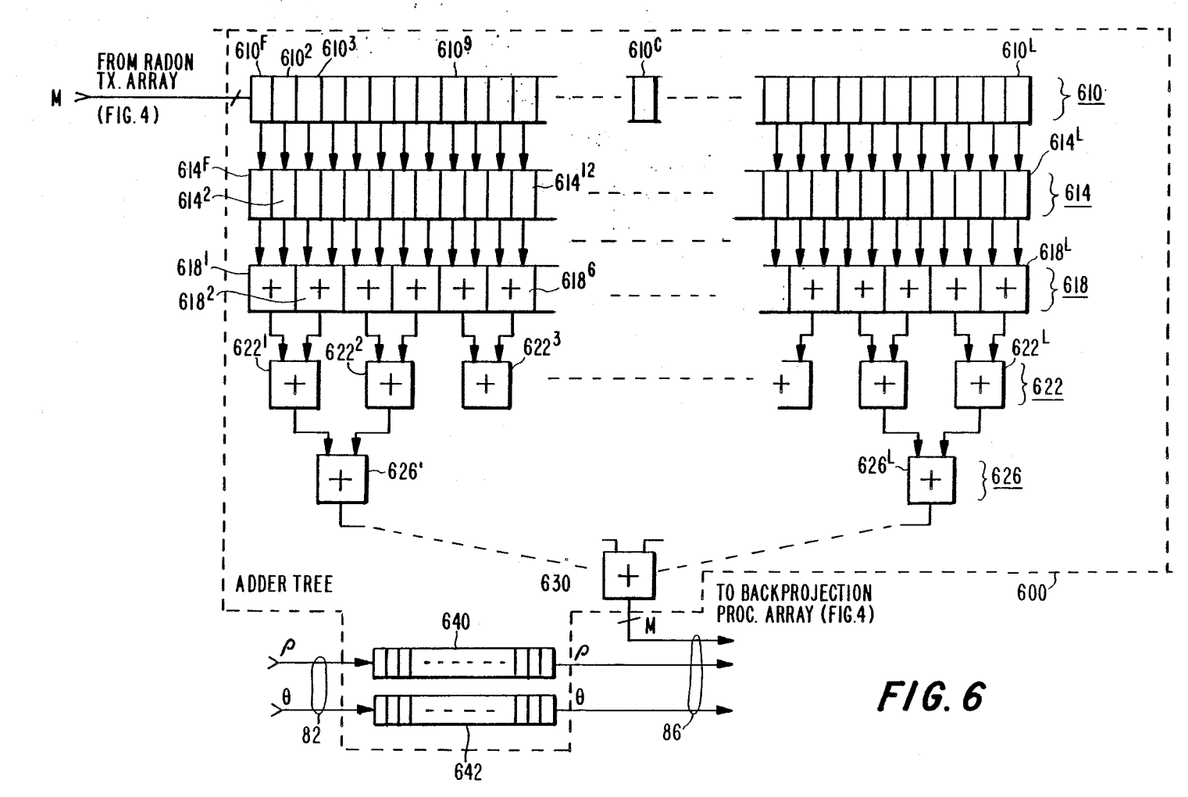
FIG. 6 illustrates in simplified block diagram form a filter or enhancer of FIG. 4.

FIG. 6 is a simplified block diagram of filter/enhancer 600. The filtering produced by processor 600 is equivalent to spatial convolution. The convolution is performed in general by multiplying P values by constants, and summing the results. The value of the constants or coefficients determines the frequency bandpass characteristic of filter/enhancer 600. The sum of products is performed for each pixel value, so that one output value occurs for each input value. This accomplished by taking a fixed number of pixels adjacent to the current value as inputs to the multiplier.

In FIG. 6, a shift register designated generally as 610 includes a first stage $610^F$ $610^2$, $610^3$ ... $610^L$. The center stage of shift register 610 is stage $610^C$. Line-integral magnitude values M are applied to the first stage $610^F$ and propagate to the right. After a predetermined number of clock pulses, a particular pixel reaches stage $610^C$. This is the reference point which may be viewed as the beginning of processing for the particular pixel in question, rather than that pixel merely contributing its magnitude to that of a remote pixel. At each clock pulse, the value of the pixel currently occupying a stage is applied to a memory $614^F$, $614^2$, $614^3$ ... $614^L$. Each pixel magnitude addresses a memory location which is preprogrammed with the memory address multiplied by a predetermined constant. The outputs of the memories correspond to multiplication by the constants. The constants may vary for different positions along the shift register, corresponding to a weighting. Memories 614 may, if desired, be random access memories so that the filter characteristics can be changed dynamically by reprogramming of the memory contents. The outputs of memories 614 are applied in pairs to adders $618^1$, $618^2$ ... $618^L$ of a first rank 618 of an adder tree. The outputs of the adders 618 of the first rank of the adder tree are applied in pairs to the inputs of adders $622^1$, $622^2$ ... $622^L$ of a second rank 622 of the adder tree. A third rank 626 including $626^1$ and $626^L$ is illustrated. Eventually, the last sum is performed in the last adder 630, to produce the filtered magnitude M on an output conductor set of bus 86. In addition, $\rho$ and $\theta$ signals representing the particular pixels applied to filter 600 are applied to shift registers 640 and 642, respectively, for delaying the $\rho$ and $\theta$ information for a number of clock pulses corresponding to the time required for a particular pixel to be shifted from input or first shift register stage $610^F$ to center shift register stage $610^C$, and for the further steps vertically through memory $614^C$ and the adder tree.

Figure 7:
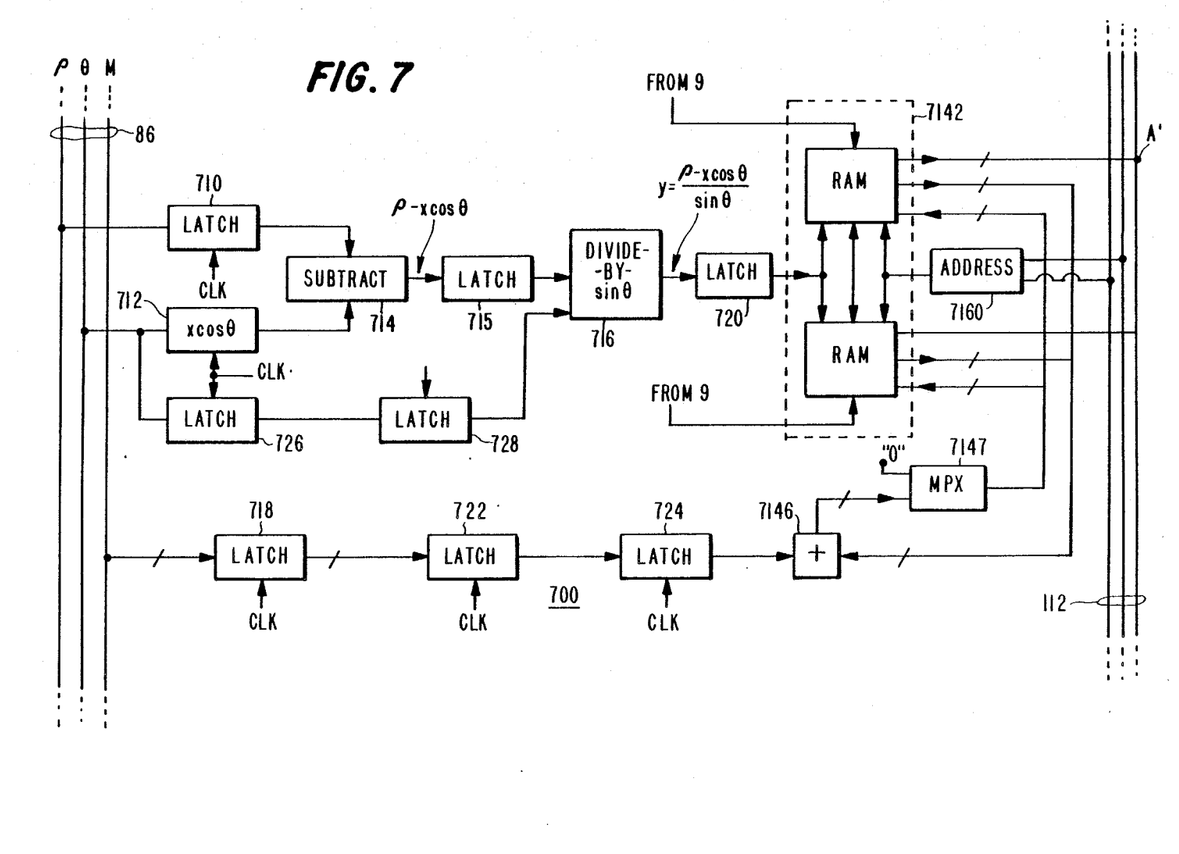
FIG. 7 illustrates in simplified block diagram form a back projection processor of FIG. 4.

Referring once again to FIG. 4, it will be noted that the outputs from filter 600 are applied over $\rho$, $\theta$, and M conductor sets of bus 86 to a set of backprojection processors 100–110, 700, each of which is associated with one value of x. FIG. 7 illustrates (in more detail) backprojection processor 700, which happens to be for a value of $x = +R$. Elements of FIG. 7 corresponding to those of FIG. 4 are designated by the same reference numerals.

In general, FIG. 7 represents a systolic processor similar to a processor of the input array. The process for computing the backprojection image includes, for each filtered Radon transform value at a given $\rho$ and $\theta$, computing all pairs x, y which satisfy the line equation $\rho = x \cos \theta + y \cos \theta$. After computing all such pairs, the Radon transform value for each of these x, y locations is summed. Since each backprojection processor corresponds to a fixed value of x, the corresponding value of y must be computed, which is given by:

$$y = (\rho - x \cos\theta)/\sin\theta$$

In FIG. 7, sets of $\rho$, $\theta$ and M words are applied over bus 86 during each video clock cycle. At each clock cycle, latches 710 and 718 latch $\rho$ and M, respectively, and latched ROM 712, which is addressed by $\theta$, latches the product of x cos $\theta$. Subtractor 714 produces the difference signal $\rho - x \cos \theta$. At the next following clock cycle, latch 715 latches the difference signal from subtractor 714, and latch 722 latches the value of M previously latched by latch 718. The $\rho - \cos \theta$ signal latched by latch 715 is applied as part of an address to a ROM 716, together with the delayed value of $\theta$ produced at the output of a latch 728. Thus, the addressed location in ROM 716 is determined by both the value of $\rho - \cos \theta$ and of $\theta$. This may be viewed as selection of a page of memory by the current value of $\theta$, and selection of a location on that page by the value of $\rho - \cos \theta$. Each memory location is preprogrammed with the quotient of $(\rho - \cos \theta)/\sin \theta$. At each clock cycle, ROM 716 produces a word at its output representative of $$y = \frac{\rho - x \cos \theta}{\sin \theta}$$

which is latched by a latch 720 for application to a multiple-port RAM 7142. The corresponding value of M is latched by a latch 724 for applicator to an adder 7146. The arrangement of multiple-port RAM 7142, address comparator 7160, summer 7146 and multiplexer 7147 corresponds to the arrangement of multiple-port RAM 142, address comparator 160, summer 146 and multiplexer 147 of FIG. 5, and operates in a similar manner for coupling inverse Radon transform information A' onto bus 112 in response to x and y addresses.

Figure 8:
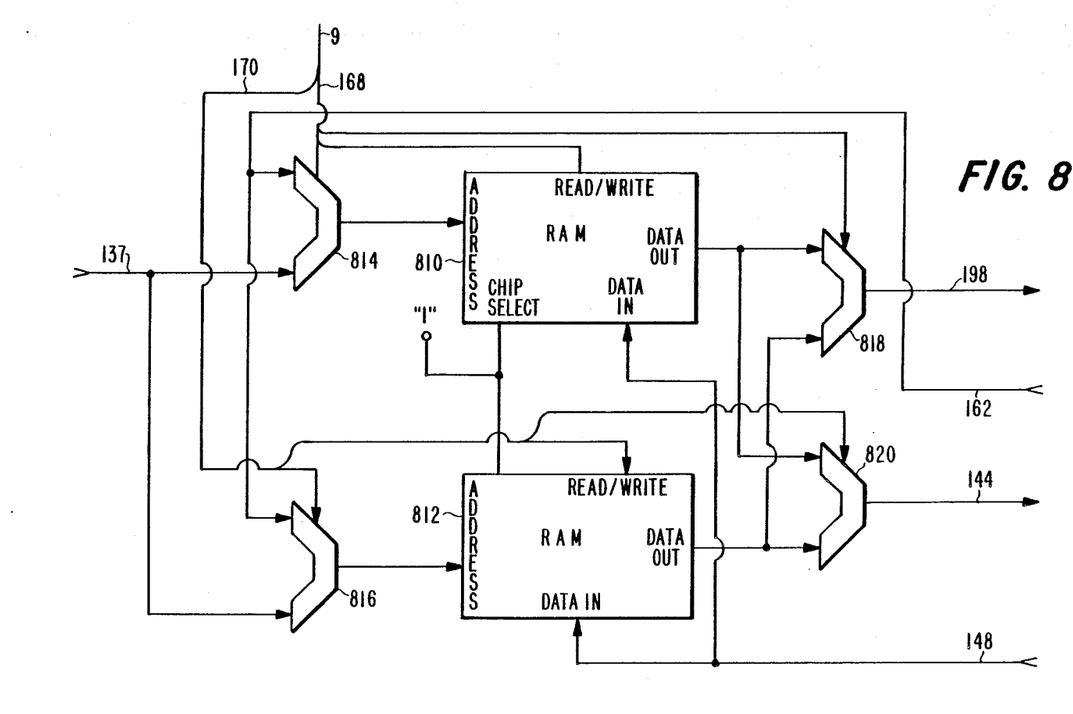
FIG. 8 illustrates details of the multiplexing of video RAMs in the processor of FIG. 5.

FIG. 8 is a more detailed block diagram of the multiplexing used within multiple-port RAM 142 of FIG. 5. Elements of FIG. 8 corresponding to FIG. 5 are designated by the same reference numerals. In FIG. 8, RAMS 810 and 812 are dimensioned (have sufficient memory) for the amount of storage required, and each includes address, data input and data output ports, a chip select terminal and a read/write or write enable output terminal. The addresses are supplied from conductor set 137 for reading and writing and from set 162 for reading to the output bus. For this purpose, the addresses from conductor sets 137 and 162 are multiplexed by multiplexers 814 and 816 under control of controller 8 (FIG. 4) by way of bus 9. The read and write functions of RAMS 810 and 812 are controlled from bus 9 as required. The chip select inputs are illustrated as tied to a logic high or logic "1" level, but hose skilled in the art know that when the memory comprises many chips the chip select input may be connected to be addressed as required. The data produced at the DATA OUTPUT port of each chip is applied by controlled multiplexers 818 and 820 to either summer 146 by way of conductor set 144 or to output bus 82 by way of conductor set 198.

Other embodiments of the invention will be apparent to those skilled in the art. For example, analog processing may be used instead of digital processing where appropriate. Also, instead of using a multipage ROM 716 as illustrated and described in conjunction with FIG. 7, latch 728 could instead be a ROM addressed by $\theta$ and preprogrammed with $1/\sin\theta$, and a multiplier could be substituted for ROM 716, which multiplier would receive $\rho - \cos\theta$ from latch 715 and $1/\sin\theta$ from the newly added ROM for multiplying them to produce $(\rho - \cos\theta)/\sin\theta$.

What is claimed is:

1. A line-scan-to-Radon-transform converter adapted for receiving words representing the x- and y-axis Cartesian coordinate location of each pixel and words representing the amplitude of said pixel, comprising:

first memory means preprogrammed with information relating to a particular value of $\theta$, the angle relative to said x-axis at which the Radon transform is to be calculated;

first multiplying means coupled to said first memory means and to sequentially receive, for each pixel in its turn, said x-axis word representing the x-position of said pixel for producing a first product signal representative of said x-axis word multiplied by a trigonometric function of $\theta$;

second multiplying means coupled to said first memory means and to receive said y-axis word representing the y-position of said pixel for producing a second product signal representative of said y-axis word multiplied by another trigonometric function of $\theta$;

adder means coupled to said first and second multiplying means for combining said first and second product signals relating to the same pixel for generating a sum signal indicative of the value of $\rho$ at which said pixel contributes to the Radon transform for said value of $\theta$;

second memory means including individual storage locations addressed by each of a plurality of values of $\rho$, said second memory means being addressed by said sum signal for producing for each addressed storage location a cumulated signal representing the current value of a line integral at the value of $\rho$ corresponding to said pixel for said value of $\theta$;

summing means coupled to said second memory means for receiving said cumulated signal from said storage location addressed by said sum signal for updating said cumulated signal at said storage location addressed by said sum signal by adding to said cumulated signal said word representing the amplitude of said pixel; and means coupled to said second memory means and adapted for being enabled for reading from said storage locations the value of said line integral for each value of $\rho$ at said value of $\theta$.

2. A converter according to claim 1 wherein at least one of said first and second multiplying means comprises a memory including addressable storage locations, each of which is preprogrammed with a word representing the address of said storage location multiplied by a trigonometric function of said value of $\theta$.

3. A converter according to claim 2 wherein said one of said multiplying means is said first multiplying means, and said trigonometric function is the cosine.

4. A converter according to claim 2 wherein said one of said multiplying means is said second multiplying means, and said trigonometric function is the sine.

5. A converter array for generating the Radon transformation from a stream of x- and y-axis Cartesian coordinate words representing in turn the location of each pixel and a corresponding stream of amplitude words representing the amplitude of the corresponding pixel, comprising a plurality of Radon transform converters, each of said converters being coupled to receive said x- and y-axis words and amplitude words, each of said converters including first memory means preprogrammed with information relating to a particular value of $\theta$ individual to the converter, where $\theta$ is the angle in said Cartesian coordinate system at which the transform is to be taken, each of said converters further comprising:

first multiplying means coupled to said first memory means and to sequentially receive, for each pixel in its turn, said x-axis word representing the x-position of said pixel for producing a first product signal representative of said x-axis word multiplied by the cosine of $\theta$;

second multiplying means coupled to said first memory means and to receive said y-axis word representing the y-position of said pixel for producing a second product signal representative of said y-axis word multiplied by the sine of $\theta$;

adder means coupled to said first and second multiplying means for adding together said first and second product signals relating to the same pixel for generating a sum signal indicative of the value of $\rho$ at which said pixel contributes to the Radon transform for said value of $\theta$;

second memory means including individual storage locations addressed by each of a plurality of values of $\rho$, said second memory means being addressed by said sum signal for producing for each addressed storage location a cumulated signal representing the current value of a line integral at the value of $\rho$ corresponding to said pixel for said value of $\theta$;

summing means coupled to said second memory means for receiving said cumulated signal from said storage location addressed by said sum signal for updating said cumulated signal at said storage location addressed by said sum signal by adding to said cumulated signal said word representing the amplitude of said pixel; and means coupled to said second memory means and adapted for being enabled for reading from said storage locations the value of said line integral for each value of $\rho$ at said value of $\theta$.

6. A converter according to claim 5 wherein at least one of said first and second multiplying means comprises a memory including addressable storage locations, each of which is preprogrammed with a word representing the address of said storage location multiplied by a trigonometric function of said value of $\theta$.

7. A method for producing a Radon transform from signals representing the x and y position of each pixel of an image and signals representing the magnitude of each pixel, comprising the steps of:

multiplying the x-position signals by the cosine of a fixed angle $\theta$ to produce an x cos$\theta$ signal;

multiplying the y-position signals by the sine of said fixed angle to produce a y sin$\theta$ signal;

adding together said x cos$\theta$ and y sin$\theta$ signals to produce a rho signal representative of the distance from image center at which a contribution to a line integral is to be made for said fixed angle; and summing together and storing said signals representative of the magnitude of each pixel which occur for a given value of said rho signal to produce stored signals.

8. A method according to claim 7 further comprising the step of:

performing said multiplying the x-position signals, multiplying the y-position signals, adding, and summing together and storing steps for each of a plurality of fixed values of said fixed angle.

9. An inverse Radon transform converter for receiving words representing $\rho$ and $\theta$ and the value of the Radon transform for each value of $\rho$ and $\theta$, comprising:

first multiplying means coupled to receive words representative of the $\theta$ value of each pixel for generating a word representative of x cos $\theta$, where the value of x represents a position in a rectangular x-y coordinate system for which the inverse Radon transform is to be calculated;

subtracting means coupled to said first multiplying means and to sequentially receive, for each pixel in its turn, words representative of the $\rho$ value of said pixel for producing a difference signal representing $\rho$-x cos $\theta$;

dividing means coupled to said subtracting means and to receive words representative of said $\theta$ value of said pixel for dividing said difference signal by sin $\theta$ to produce the quotient signal $y=(\rho$-x cos $\theta)$/sin $\theta$;

summing means including a first input port coupled to receive words representative of the value M of said Radon transform of said pixels for summing said words representative of the value of M with words applied to a second input port; and memory means coupled to said dividing means and to said summing means, and including individual storage locations addressed by each of said plurality of values of y produced by said dividing means for producing for each addressed storage location a cumulated signal representing the current value of the inverse Radon transform at the value of y corresponding to said pixel for said value of x, and for applying said current value of said inverse Radon transform to said second input port of said summing means for generating an updated value of said inverse Radon transform at the output of said summing means, and for substituting said updated value at said addressed storage locations.

* * * * *